United States Patent
Jeon

(10) Patent No.: US 11,260,854 B2
(45) Date of Patent: Mar. 1, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Junghoon Jeon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 170 days.

(21) Appl. No.: 16/751,331

(22) Filed: Jan. 24, 2020

(65) Prior Publication Data

US 2021/0101589 A1    Apr. 8, 2021

(30) Foreign Application Priority Data

Oct. 8, 2019   (KR) ........................ 10-2019-0124289

(51) Int. Cl.
| | |
|---|---|
| *B60W 30/09* | (2012.01) |
| *B62D 15/02* | (2006.01) |
| *B60W 60/00* | (2020.01) |
| *G05D 1/00* | (2006.01) |
| *B60W 40/04* | (2006.01) |
| *B60W 10/18* | (2012.01) |

(Continued)

(52) U.S. Cl.
CPC ............. *B60W 30/09* (2013.01); *B60T 7/22* (2013.01); *B60W 10/18* (2013.01); *B60W 10/20* (2013.01); *B60W 40/04* (2013.01); *B60W 60/0051* (2020.02); *B62D 15/0255* (2013.01); *B62D 15/0265* (2013.01); *G05D 1/0061* (2013.01); *B60W 30/18163* (2013.01); *B60W 2520/14* (2013.01); *B60W 2554/00* (2020.02); *B60W 2710/18* (2013.01); *B60W 2710/20* (2013.01); *B60Y 2200/143* (2013.01); *G05D 2201/0213* (2013.01)

(58) Field of Classification Search
None
See application file for complete search history.

(56) References Cited

U.S. PATENT DOCUMENTS

2017/0008534 A1*  1/2017  Nakatsuka ............. B60K 28/06
2017/0144658 A1*  5/2017  Viehmann .......... B62D 15/0265
(Continued)

*Primary Examiner* — Dale W Hilgendorf
*Assistant Examiner* — Alexander C. Bost
(74) *Attorney, Agent, or Firm* — Morgan, Lewis & Bockius LLP

(57) ABSTRACT

A vehicle includes an inputter receiving an emergency stop command; an emergency stop condition determiner determining that an emergency stop condition is satisfied when a driver's state is determined as a predetermined inoperable state, a steering wheel is not operated for a predetermined time period, or a rate of change of a yaw rate of the vehicle exceeds a predetermined value; a sensor configured for detecting an obstacle around the vehicle; and a controller configured to determine whether the vehicle can avoid collision with a front obstacle only by braking without a lane change, to determine a risk area in an adjacent lane based on a braking distance of the vehicle and obstacle detection information in a lane adjacent to a driving lane of the vehicle, and to control the lane change or a braking process of the vehicle based on whether the obstacle is detected in the determined risk area.

14 Claims, 10 Drawing Sheets

(51) Int. Cl.
 *B60W 10/20* (2006.01)
 *B60T 7/22* (2006.01)
 *B60W 30/18* (2012.01)

(56) References Cited

U.S. PATENT DOCUMENTS

| | | | |
|---|---|---|---|
| 2017/0291602 A1* | 10/2017 | Newman | B60W 10/184 |
| 2018/0043887 A1* | 2/2018 | Newman | B60W 50/14 |
| 2018/0081358 A1* | 3/2018 | Laur | G05D 1/0055 |
| 2018/0299887 A1* | 10/2018 | Cashier | B60W 30/18163 |
| 2019/0071076 A1* | 3/2019 | Nakatsuka | B60W 40/08 |
| 2019/0270452 A1* | 9/2019 | Katsura | B60W 30/0956 |
| 2019/0276013 A1* | 9/2019 | Kim | B60W 50/0097 |
| 2020/0008732 A1* | 1/2020 | Sawai | A61B 5/18 |
| 2020/0079379 A1* | 3/2020 | Mimura | B60W 10/20 |
| 2020/0094875 A1* | 3/2020 | Mimura | B62D 15/0265 |
| 2020/0148214 A1* | 5/2020 | Tamagaki | B60W 30/14 |
| 2021/0197776 A1* | 7/2021 | Dieckmann | B60Q 9/008 |

\* cited by examiner

VEHICLE AND METHOD OF CONTROLLING THE SAME

CROSS-REFERENCE TO RELATED APPLICATION(S)

The present application claims priority to Korean Patent Application No. 10-2019-0124289, filed on Oct. 8, 2019 in the Korean Intellectual Property Office, the entire contents of which is incorporated herein for all purposes by this reference.

BACKGROUND OF THE INVENTION

Field of the Invention

The present invention relates to a vehicle and a method of controlling the vehicle, and more particularly, to a technology capable of avoiding a collision of the vehicle when a driver of the vehicle is in an inoperable state.

Description of Related Art

Generally, vehicles are driven on roads or tracks to transport people or goods to destinations. Vehicles are able to move to various locations on one or more wheels mounted onto the frame of the vehicle. Such vehicles may be classified into three-wheel or four-wheel vehicles, a bus, a medium-large truck, a two-wheel vehicle such as a motorcycle, construction machinery, bicycles, trains traveling along rails on tracks, and the like.

In modern society, vehicles are the most common transportation means, and people using the vehicles have been increasing. With the development of automotive technology, there are advantages of traveling long distances, but problems also often arise in traffic conditions worsen and traffic jams increase where population densities are high.

To relieve burdens and increase convenience of a driver, recent studies regarding vehicles provided with an Advanced Driver Assist System (ADAS) that actively provides information regarding a state of the vehicle, a state of the driver, and surrounding conditions are actively ongoing.

Examples of the ADAS provided within the vehicle include Smart Cruise Control System, Lane Keeping Assist System, Lane Following Assist and Lane Departure Warning System, Forward Collision Avoidance (FCA), and Autonomous Emergency Brake (AEB).

The systems have a problem in that the damage of the driver and a passenger cannot be minimized through direct control of the vehicle when the driver of the vehicle is in an inoperable state.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle that prevents a traffic accident by automatically performing a lane change and a braking in consideration of surrounding traffic conditions when a driver is in an inoperable state while the vehicle is driving, and a method of controlling the vehicle.

Additional aspects of the present invention will be set forth in part in the description which follows, and in part, will be obvious from the description, or may be learned by practice of the present invention.

In accordance with an aspect of the present invention, a vehicle includes an inputter configured to receive an emergency stop command; an emergency stop condition determiner configured to determine that an emergency stop condition is satisfied when a driver's state is determined as a predetermined inoperable state, a steering wheel is not operated for a predetermined time period, or a rate of change of a yaw rate of the vehicle exceeds a predetermined value; a sensor configured to detect at least an obstacle around the vehicle; and a controller configured to, when the emergency stop command is received or the emergency stop condition is satisfied, determine whether the vehicle can avoid collision with a front obstacle only by braking without a lane change, when it is determined, by the controller, that the vehicle cannot avoid the collision with the front obstacle only by braking, to determine a risk area in an adjacent lane based on a braking distance of the vehicle and obstacle detection information in a lane adjacent to a driving lane of the vehicle, and to control the lane change or a braking process of the vehicle based on whether the obstacle is detected in the determined risk area.

The controller may be configured to control the vehicle to brake the vehicle while keeping the driving lane when it is determined, by the controller, that the vehicle can avoid collision with the front obstacle only by braking without the lane change.

The controller may be configured to control the vehicle to brake the vehicle while keeping the driving lane when the obstacle is detected within the risk area.

The controller may be configured to control the vehicle to be braked by changing the lane on which the vehicle is driven to the adjacent lane when the obstacle is not detected within the risk area.

The controller may be configured to determine a front lateral side risk area based on the braking distance of the vehicle, to determine a lateral side risk area based on an overall length of the vehicle, and to determine a rear lateral side risk area based on a stopping distance of a rear obstacle in the adjacent lane.

The controller may be configured to transmit a control signal for generating a first steering torque for steering the steering wheel of the vehicle, when it is determined, by the controller, that the first steering torque and a change amount in a steering angle of the steering wheel do not correspond, to transmit a control signal for generating a first steering torque for fixing the steering wheel, and to control the vehicle to brake the vehicle while keeping the driving lane.

The controller may be configured to determine a warning area in the adjacent lane based on the braking distance of the vehicle and obstacle information in the lane adjacent to the driving lane, to determine a lane to be changed by the vehicle among the adjacent lanes based on whether the obstacle is detected in the warning area, and to control the vehicle to be braked by changing the lane on which the vehicle is driven to the determined lane. The warning area may be determined to be an area farther from the risk area with respect to the vehicle.

When the obstacle is detected in the warning area in the first adjacent lane of the adjacent lane and the obstacle is not detected in the warning area in the second adjacent lane which is the adjacent lane in the opposite direction to the first adjacent lane of the adjacent lane, the controller may be configured to control the vehicle to be braked by changing the lane on which the vehicle is driven to the second adjacent lane.

When the emergency stop command is received or the emergency stop condition is satisfied, the controller may be configured to transmit at least one of a control signal for operating an emergency light of the vehicle and a control signal for ringing a horn of the vehicle.

The controller may be configured to change a driving mode of the vehicle to an autonomous driving mode when the emergency stop command is received or the emergency stop condition is satisfied.

The inputter may be configured to receive an emergency stop release command. The controller may be configured to change the driving mode of the vehicle to a manual driving mode when the emergency stop release command is received.

The controller may be configured to determine that an emergency stop condition is satisfied when a driver's state is determined as a predetermined inoperable state, a steering wheel is not operated for a predetermined time period, or a rate of change of a yaw rate of the vehicle exceeds a predetermined value.

The inputter may include at least one of a driver button for receiving at least one of an emergency stop command and an emergency stop release command from a driver of the vehicle and a passenger button for receiving the emergency stop command from a passenger of the vehicle, In accordance with another aspect of the present invention, a method of controlling a vehicle includes determining, by a controller, whether an emergency stop command is received or an emergency stop condition is satisfied; when the emergency stop command is received or the emergency stop condition is satisfied, determining, by the controller, whether the vehicle can avoid collision with a front obstacle only by braking without a lane change; when it is determined, by the controller, that the vehicle cannot avoid the collision with the front obstacle only by braking, determining, by the controller, a risk area in an adjacent lane based on a braking distance of the vehicle and obstacle detection information in a lane adjacent to a driving lane of the vehicle; and controlling, by the controller, the lane change or a braking process of the vehicle based on whether the obstacle is detected in the determined risk area.

The method may further include controlling, by the controller, the vehicle to brake the vehicle while keeping the driving lane when it is determined, by the controller, that the vehicle can avoid collision with the front obstacle only by braking without the lane change.

The controlling of the lane change or the braking process of the vehicle based on whether the obstacle is detected in the determined risk area may include controlling the vehicle to brake the vehicle while keeping the driving lane when the obstacle is detected within the risk area.

The controlling of the lane change or the braking process of the vehicle based on whether the obstacle is detected in the determined risk area may include controlling the vehicle to be braked by changing the lane on which the vehicle is driven to the adjacent lane when the obstacle is not detected within the risk area.

The determining of the risk area in the adjacent lane based on the braking distance of the vehicle and the obstacle detection information in the lane adjacent to the driving lane of the vehicle may include determining a front lateral side risk area based on the braking distance of the vehicle; determining a lateral side risk area based on an overall length of the vehicle; and determining a rear lateral side risk area based on a stopping distance of a rear obstacle in the adjacent lane.

The method may further include transmitting, by the controller, a control signal for generating a first steering torque for steering the steering wheel of the vehicle; when it is determined, by the controller, that the first steering torque and a change amount in a steering angle of the steering wheel do not correspond, transmitting, by the controller, a control signal for generating a first steering torque for fixing the steering wheel; and controlling, by the controller, the vehicle to brake the vehicle while keeping the driving lane.

The controlling of the lane change or the braking process of the vehicle based on whether the obstacle is detected in the determined risk area may include determining, a warning area in the adjacent lane based on the braking distance of the vehicle and obstacle information in the lane adjacent to the driving lane; determining, a lane to be changed by the vehicle among the adjacent lanes based on whether the obstacle is detected in the warning area; and controlling, the vehicle to be braked by changing the lane on which the vehicle is driven to the determined lane. The warning area may be determined to be an area farther from the risk area with respect to the vehicle.

The controlling of the lane change or the braking process of the vehicle based on whether the obstacle is detected in the determined risk area may include, when the obstacle is detected in the warning area in the first adjacent lane of the adjacent lane and the obstacle is not detected in the warning area in the second adjacent lane which is the adjacent lane in the opposite direction to the first adjacent lane of the adjacent lane, controlling the vehicle to be braked by changing the lane on which the vehicle is driven to the second adjacent lane.

When the emergency stop command is received or the emergency stop condition is satisfied, the method may further include transmitting, by the controller, at least one of a control signal for operating an emergency light of the vehicle and a control signal for ringing a horn of the vehicle.

The method may further include changing, by the controller, a driving mode of the vehicle to an autonomous driving mode when the emergency stop command is received or the emergency stop condition is satisfied.

The method may further include changing, by the controller, the driving mode of the vehicle to a manual driving mode when the emergency stop release command is received.

The determining of whether the emergency stop condition is satisfied may include determining that the emergency stop condition is satisfied when a driver's state is determined as a predetermined inoperable state, a steering wheel is not operated for a predetermined time period, or a rate of change of a yaw rate of the vehicle exceeds a predetermined value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
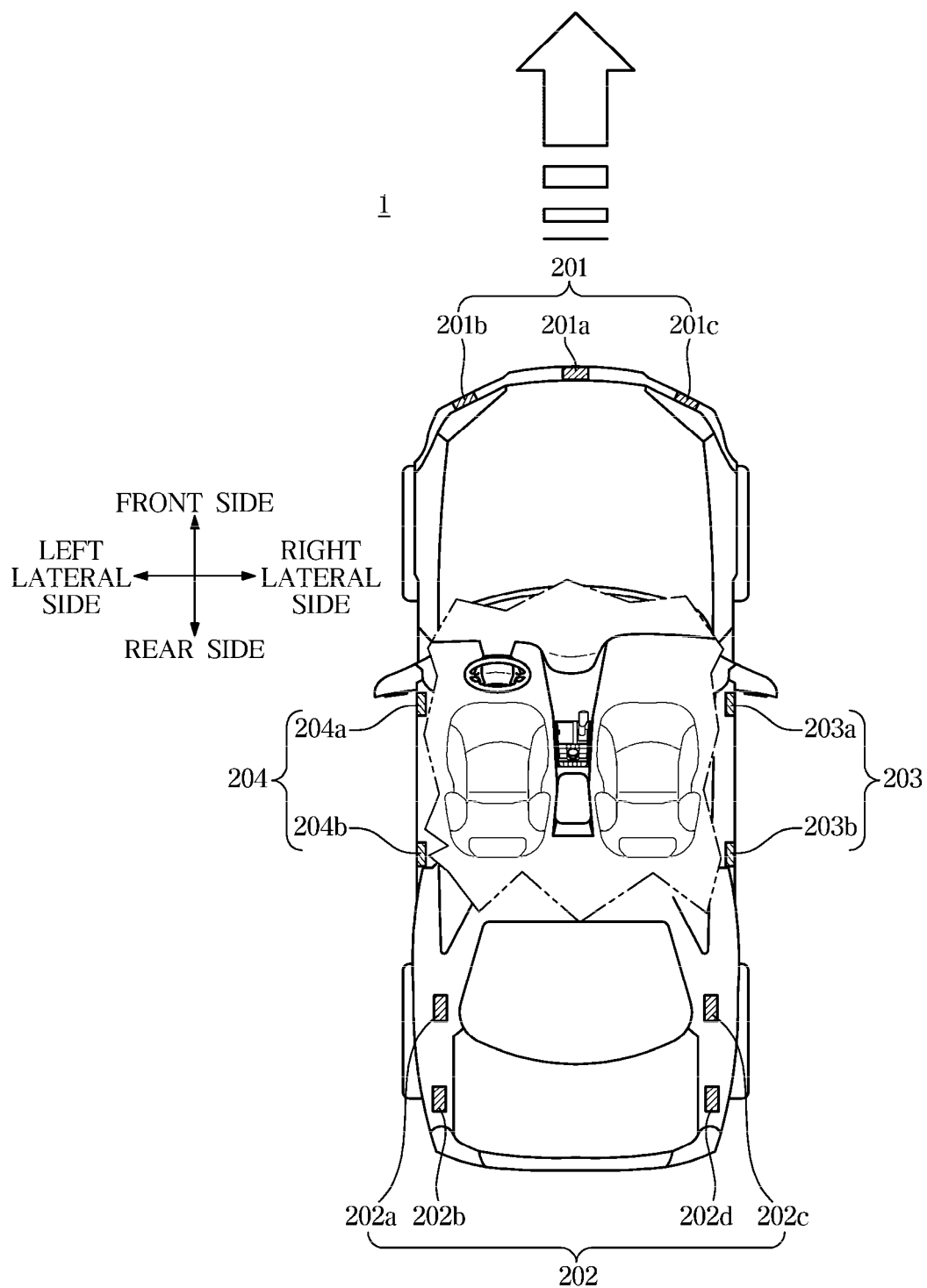
FIG. 1 is a view exemplarily illustrating an exterior of a vehicle according to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of exemplary embodiments of the present invention will be described, and description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

When a part "includes" or "comprises" an element, unless there is a particular description contrary thereto, the part may further include other elements, not excluding the other elements.

It will be understood that, although the terms first, second, third, etc., may be used herein to describe various elements, it may not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Furthermore, an "obstacle" in the exemplary embodiment may refer to all objects which have a possibility of collision with a vehicle 1, and may include not only moving objects such as other vehicles, pedestrians, cyclists, etc., but also stationary objects such as trees or street lights.

The principle and exemplary embodiments of the present invention will now be described with reference to the accompanying drawings.

FIG. 1 is a view exemplarily illustrating an exterior of a vehicle according to exemplary embodiments of the present invention.

Hereinafter for convenience of description, a direction in which the vehicle 1 drives forward may be defined as the front side, and the left direction and the right direction may be defined with respect to the front side thereof. When the front side is a 12 o'clock direction, a 3 o'clock direction or in the vicinity of the 3 o'clock direction may be defined as the right direction and a 9 o'clock direction or in the vicinity of the 9 o'clock direction may be defined as the left direction thereof. A direction opposite to the front side may be defined as the rear side thereof. Additionally, a surface disposed on the front side may be defined as a front surface, a surface disposed on the rear side may be defined as a rear surface, and a surface disposed on the lateral side may be defined as a side surface. Furthermore, a side surface in the left direction may be defined as a left surface and a side surface in the right direction may be defined as a right surface.

Referring to FIG. 1, a sensor 200 may be internally mounted within the vehicle 1. The sensor 200 may detect the obstacle located in the front side of the vehicle 1 and obtain at least one of position information and driving speed information related to the detected obstacle.

The sensor 200 may obtain at least one of the position information and the driving speed information related to the obstacle located around of the vehicle 1 based on the vehicle 1. In other words, the sensor 200 may obtain coordinate information, which changes as the obstacle moves, in real time and detect a distance between the vehicle 1 and the obstacle.

As will be described later, a controller 400 (see FIG. 2) may determine a relative distance and a relative speed between the vehicle 1 and the obstacle based on the position and speed information related to the obstacle obtained by the sensor 200, and thus the controller 400 may determine a time to collision (TTC) between the vehicle 1 and the obstacle based on the determined relative distance and relative speed.

As illustrated in FIG. 1, the sensor 200 may be mounted in a position which is appropriate to detect an obstacle, e.g., other vehicle, in the front, lateral or front lateral side thereof. According to an exemplary embodiment of the present invention, the sensor 200 may be mounted at the front, the left and the right side of the vehicle 1 to detect the obstacle in the front side of the vehicle 1, a direction between the left side and the front side (hereinafter, referred to as "front left side") of the vehicle 1 and a direction between the right side and the front side (hereinafter, referred to as "front right side") of the vehicle 1.

For example, a first sensor 201a may be mounted as a portion of a radiator grill, e.g., internal to the radiator grill 6, or alternatively the first sensor 210a may be mounted in any position of the vehicle 1 suitable for detecting another vehicle located in the front side of the vehicle 1. However, according to an exemplary embodiment of the present invention, it will be described that the first sensor 201a is mounted in the center portion of the front surface of the vehicle 1. A second sensor 201b may be mounted in the left side of the front surface of the vehicle 1, and a third sensor 201c may be mounted in the right side of the front surface of the vehicle 1.

The sensor 200 may include a rear lateral side sensor 202 configured to detect a pedestrian or other vehicle which is present in or approaching from the rear side, lateral side or a direction between the lateral side and the rear side (hereinafter referred to as a "rear lateral side") of the vehicle 1. As illustrated in FIG. 1, the rear lateral side sensor 202 may be mounted in a position which is appropriate to detect the obstacle, e.g., other vehicle, on the lateral side, rear side or rear lateral side thereof.

The rear lateral side sensor 202 may be mounted on both the left side and the right side of the vehicle 1 so that the obstacle may be detected from both a direction (hereinafter, referred to as "rear left side") between the left side and the rear of the vehicle 1 and a direction (hereinafter, referred to as "rear right side") between the right side and the rear of the vehicle 1. For example, the rear lateral side sensor 202a or a second rear lateral side sensor 202b may be provided on the left side of the vehicle 1, and a third rear lateral side sensor 202c or a fourth rear lateral side sensor 202d may be provided on the right side of the vehicle 1.

The sensor 200 may also include a right lateral side sensor 203 and a left lateral side sensor 204 configured to detect the obstacle approaching in the right and left directions of the vehicle 1. The right lateral side sensor 203 may include a first right lateral side sensor 203a and a second right lateral side sensor 203b to completely detect obstacles in the right lateral side of the vehicle 1. The left lateral side sensor 204 may also include a first left lateral side sensor 204a and a second left lateral side sensor 204b to completely detect obstacles in the left lateral side of the vehicle 1.

The sensor 200 may be implemented using a variety of devices, e.g., a radar using millimeter waves or microwaves, Light Detection And Ranging (LiDAR) using pulsed laser light, a vision sensor using visible light, an infrared sensor using infrared light, or an ultrasonic sensor using ultrasonic waves. The sensor 200 may be implemented using any one of the radar, the Light Detection And Ranging (LiDAR), the vision sensor, the infrared sensor, or the ultrasonic sensor or by combining them. When a plurality of sensors 200 is internally mounted within the vehicle 1, each of the sensors 200 may be implemented by use of the same type of sensor or different type of sensor. The implementation of the sensor 200 is not limited thereto, and the sensor 200 may be implemented using a variety of devices and a combination thereof which is considered by a designer.

Furthermore, the plurality of sensors 200 may include an image sensor configured for detecting a lane around the vehicle 1. For example, the sensor 200 may be provided where the first 200a is located to detect the lane on which the vehicle 1 is driving.

In other words, the sensor 200 may be implemented as an image sensor such as a camera, mounted on the front of the vehicle 1, and may capture the surrounding environment in a direction (front) of the vehicle 1 while the vehicle 1 is driving. The captured image obtained from the sensor 200 may include information related to how far the vehicle 1 is from the lane, information related to how much the lane or the road is curved, and information related to how far the driving direction of the vehicle 1 departs from the lane, and the like.

Figure 2:
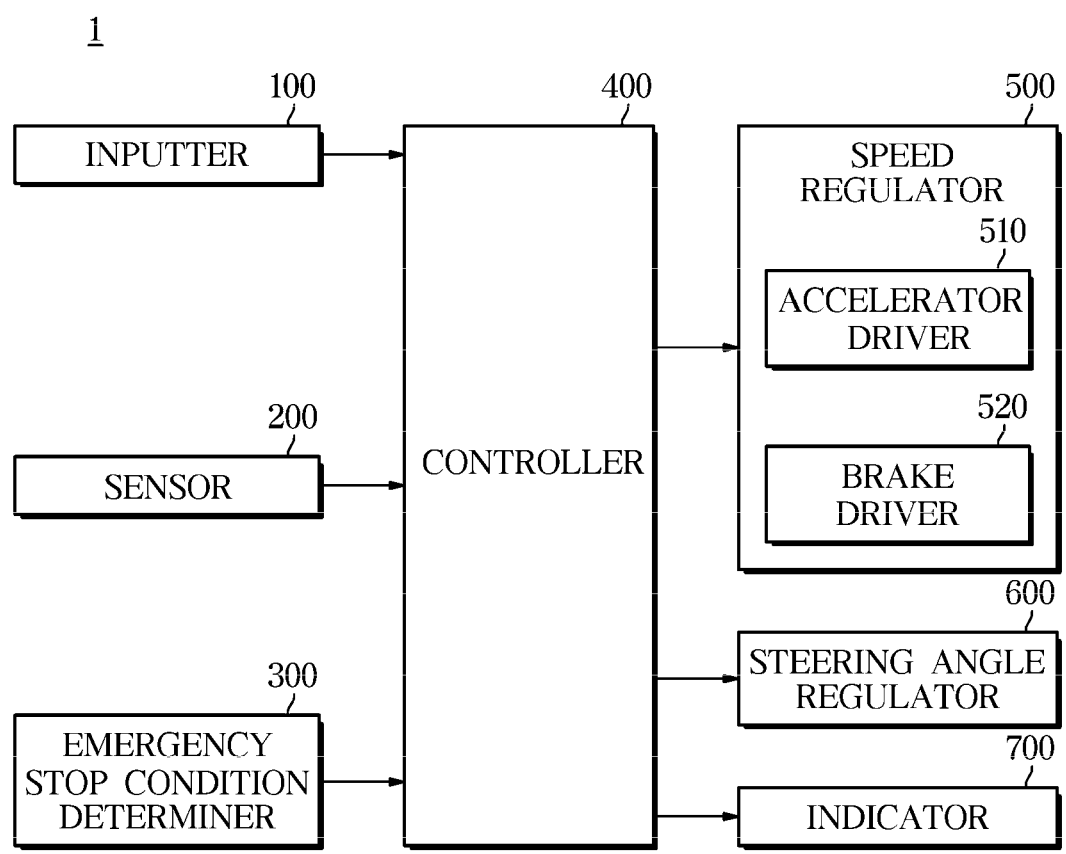
FIG. 2 is a control block diagram of a vehicle according to exemplary embodiments of the present invention.

Referring to FIG. 2, the vehicle 1 may include, a speed regulator 500 for regulating a driving speed of the vehicle 1 driven by a driver, a steering angle regulator 600 for regulating a steering angel of the vehicle 1, a speed detector for detecting the driving speed of the vehicle 1, a steering angle detector for detecting a rotation angle of a steering wheel, the sensor 200 for detecting a shape of the lane or the road on which the vehicle 1 is driving, a storage for storing data related to the operation of the vehicle 1, the controller 400 for operating each component of the vehicle 1 and controlling the driving speed and a steering angle of the vehicle 1, an indicator 700 for transmitting information to the driver in relation to the operation and driving of the vehicle 1, an inputter 100 for receiving a command related to the operation of the vehicle 1, and an emergency stop condition determiner 300 for determining whether an emergency stop condition of the vehicle 1 is satisfied.

The speed regulator 500 may regulate the speed of the vehicle 1 driven by the driver. The speed regulator 500 may include an accelerator driver 510 and a brake driver 520.

The accelerator driver 510 may increase the speed of the vehicle 1 by operating the accelerator in a response to a control signal of the controller 400. The brake driver 520 may reduce the speed of the vehicle 1 by operating the brake in a response to the control signal of the controller 400.

The speed regulator 500 may regulate the driving speed of the vehicle 1 under the control of the controller 400. When the risk of collision between the vehicle 1 and another obstacle is high, the speed regulator 500 may decrease the driving speed of the vehicle 1.

The steering angle regulator 600 may regulate the steering angle of the vehicle 1 that the driver drives. The steering angle regulator 600 may regulate the steering angle of the vehicle 1 by regulating the rotation angle of the steering wheel of the vehicle 1 under the control of the controller 400. The steering angle regulator 600 may change the steering angle of the vehicle 1 when the risk of collision between the vehicle 1 and another obstacle is high. That is, the steering angle regulator 600 may output a steering torque for steering the steering wheel of the vehicle 1 according to the control signal of the controller 400.

The speed detector may detect the driving speed of the vehicle 1 driven by the driver under the control of the controller 100. In other words, the speed detector may detect the driving speed by use of a rotation speed of the vehicle wheel, wherein the driving speed may be expressed as [kph], and a distance (km) traveled per unit time (h).

The steering angle detector may detect a steering angle which is the rotation angle of the steering wheel while the vehicle 1 is driving. In other words, when the forward obstacle is avoided through steering while the vehicle 1 is driving, the controller 400 may control the steering of the vehicle 1 based on the steering angle detected by the steering angle detector. Furthermore, the steering angle detector may detect a change amount in the steering angle of the steering wheel and transmit the change amount in the steering angle to the controller 400.

The sensor 200 may be implemented as a video sensor such as a camera, and may be mounted in the front side of the vehicle 1. The sensor 200 may capture surrounding conditions in a direction in which the vehicle 1 drives and transmit it to the controller 400. The captured image obtained from the sensor 200 may include information related to how far the vehicle 1 is from the lane, information related to how much the lane or the road is curved, and information related to how far the driving direction of the vehicle 1 departs from the lane, and the like.

The sensor 200 may obtain information related to the distance to the lane, a curvature of a driving road, and a lane departure angle, and transmit the information to the controller 400.

The storage may store various data related to the control of the vehicle 1. According to an exemplary embodiment of the present invention, the storage may store information related to the driving speed, a driving distance, and a driving time of the vehicle 1. Furthermore, the storage may store the position information and the speed information related to the obstacle detected by the sensor 200. The storage may store coordinates information related to the moving obstacle changed in real time. The storage may store information related to the relative distance and the relative speed between the vehicle 1 and the obstacle.

Furthermore, the storage may store data related to equations and control algorithms for operating the vehicle 1, and the controller 400 may transmit the control signal for operating the vehicle 1 in accordance with the equations and control algorithm.

The storage 90 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto. The storage 90 may be a memory which is implemented by a separate memory chip from the aforementioned processor related to the controller 400 or the storage may be implemented by a single chip with a processor.

The indicator 700 may transmit a warning signal according to the control signal of the controller 400. In detail, the indicator 700 may include a display, a speaker, and a vibrator provided in the vehicle 1, and may output an indication, sound, and vibration to warn the driver of the risk of collision according to the control signal of the controller 400. Furthermore, the indicator 700 may include an emergency light driving device configured for operating the emergency light of the vehicle 1, a horn driving device configured for ringing a horn of the vehicle 1, and the like.

The emergency stop condition determiner 300 may determine whether the vehicle 1 has satisfied the emergency stop condition. The emergency stop condition determiner 300 may determine that the emergency stop condition is satisfied when the driver's state is determined as a predetermined inoperable state, the steering wheel is not operated for a predetermined time period, or a rate of change of a yaw rate of the vehicle 1 exceeds a predetermined value. Furthermore, the emergency stop condition determiner 300 is illustrated separately from the controller 400, but may be included in the controller 400.

The controller 400 may include at least one memory in which a program for performing an operation described below is stored and at least one processor for executing the stored program. When there is a plurality of memories and processors, they may be integrated in one chip, or may be provided in physically separated locations.

Figure 3:
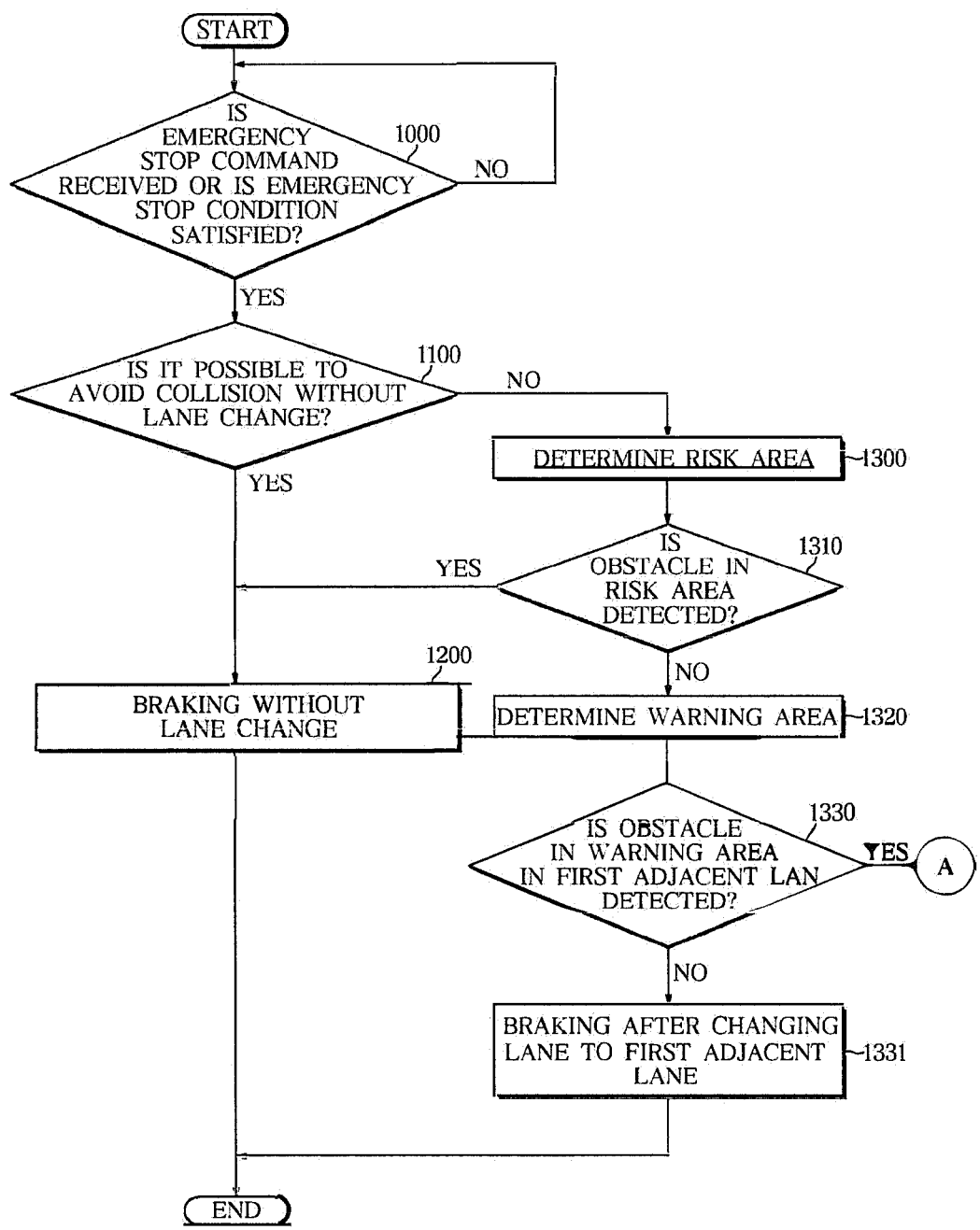
FIG. 3 and FIG. 4 are flowcharts illustrating a method of controlling a vehicle according to exemplary embodiments of the present invention.
Figure 4:
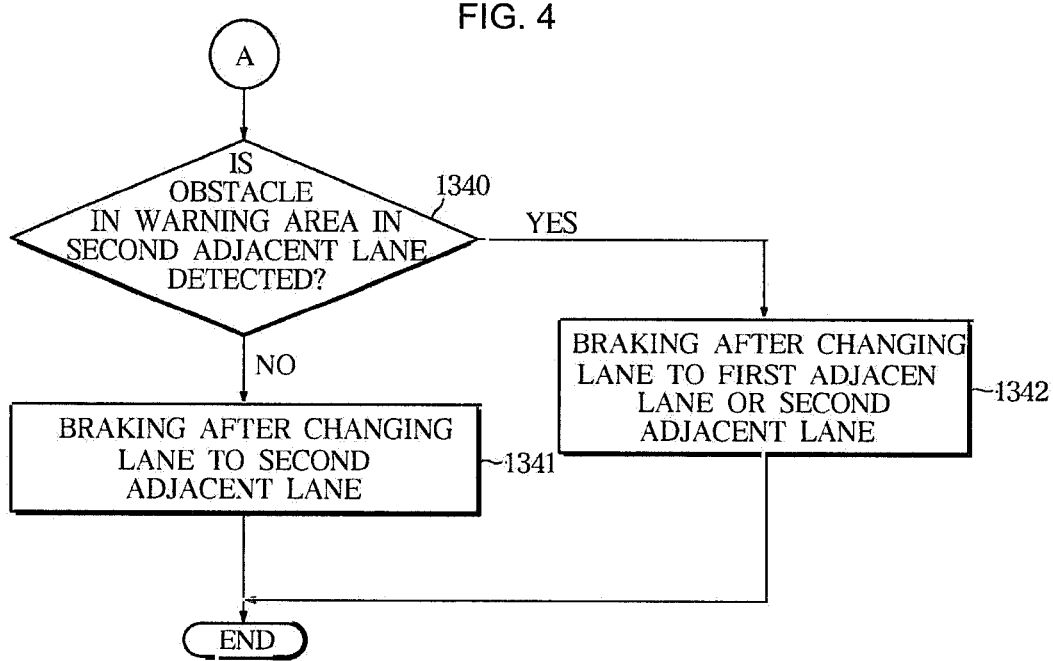

Referring to FIG. 3 and FIG. 4, when an emergency stop command is received or an emergency stop condition is satisfied, the method of controlling the vehicle 1 will be described, and FIGS. 5 to 8 will be described to support the description.

FIG. 3 and FIG. 4 are flowcharts illustrating a method of controlling a vehicle according to exemplary embodiments of the present invention, and FIGS. 5 to 8 are views for describing a method of controlling a vehicle according to exemplary embodiments of the present invention.

Referring to FIG. 3, the controller 400 may determine whether the emergency stop command is received or the emergency stop condition is satisfied through the inputter 100 (1000). At the instant time, when the emergency stop command is received or the emergency stop condition is satisfied, the vehicle 1 may enter an emergency stop mode (YES in 1000). Otherwise, it may be determined whether the emergency stop command is received and whether the emergency stop condition is satisfied. (NO in 1000).

The controller 400 may determine that the emergency stop condition is satisfied when the driver's state is determined as the predetermined inoperable state, the steering wheel is not operated for the predetermined time period, or the rate of change of the yaw rate of the vehicle 1 exceeds the predetermined value. An internal camera is provided inside the vehicle 1 to capture the driver. The emergency stop condition determiner 300 may determine the driver's state as the predetermined inoperable state when the driver's closed state exceeds a reference time or a driving posture is collapsed.

Although not illustrated in the drawing, when the vehicle 1 enters the emergency stop mode, the controller 400 may transmit at least one of the control signal for operating the emergency light of the vehicle 1 and the control signal for ringing the horn of the vehicle 1. Furthermore, the controller 400 may change a driving mode of the vehicle 1 to an autonomous driving mode when the vehicle 1 enters the emergency stop mode. That is, when the vehicle 1 enters the emergency mode, by changing the driving mode of the vehicle 1 to the autonomous driving mode, a driving control right of the driver may be deprived, preventing an unexpected accident.

When the vehicle 1 enters the emergency stop mode, the controller 400 may determine whether the vehicle 1 can avoid the collision with a front obstacle by braking without changing the lane (1100). The controller 400 may determine whether the vehicle 1 can avoid the collision with the front obstacle only by braking based on a maximum amount of braking of the vehicle 1, the relative speed and relative distance with a front obstacle ob1, the speed of the vehicle 1, and the like.

When the vehicle 1 can avoid collision with the front obstacle ob1 only by braking (YES in 1100), the controller 400 may control the vehicle 1 such that the vehicle 1 is braked while keeping a driving lane LD (1200). In other words, when it is determined that the collision may be avoided without changing the lane of the vehicle 1, the collision may be avoided only by braking to prevent a risk of a secondary collision due to the steering and to achieve a safe stop of the vehicle 1.

When the vehicle 1 cannot avoid collision with the front obstacle ob1 only by braking (NO of 1100), the controller 400 may determine a risk area in an adjacent lane based on obstacle detection information in lanes LL and LR adjacent to the driving lane LD of the vehicle 1 (1300). The controller 400 may determine front lateral side risk areas FLA and FRA based on the braking distance based on the maximum amount of braking of the vehicle 1, may determine lateral side risk areas SLA and SRA based on an full length of the vehicle 1, and may determine rear lateral side risk areas RLA and RRA based on a stopping distance of the rear obstacle ob2 in the adjacent lanes LL and LR.

Figure 5:
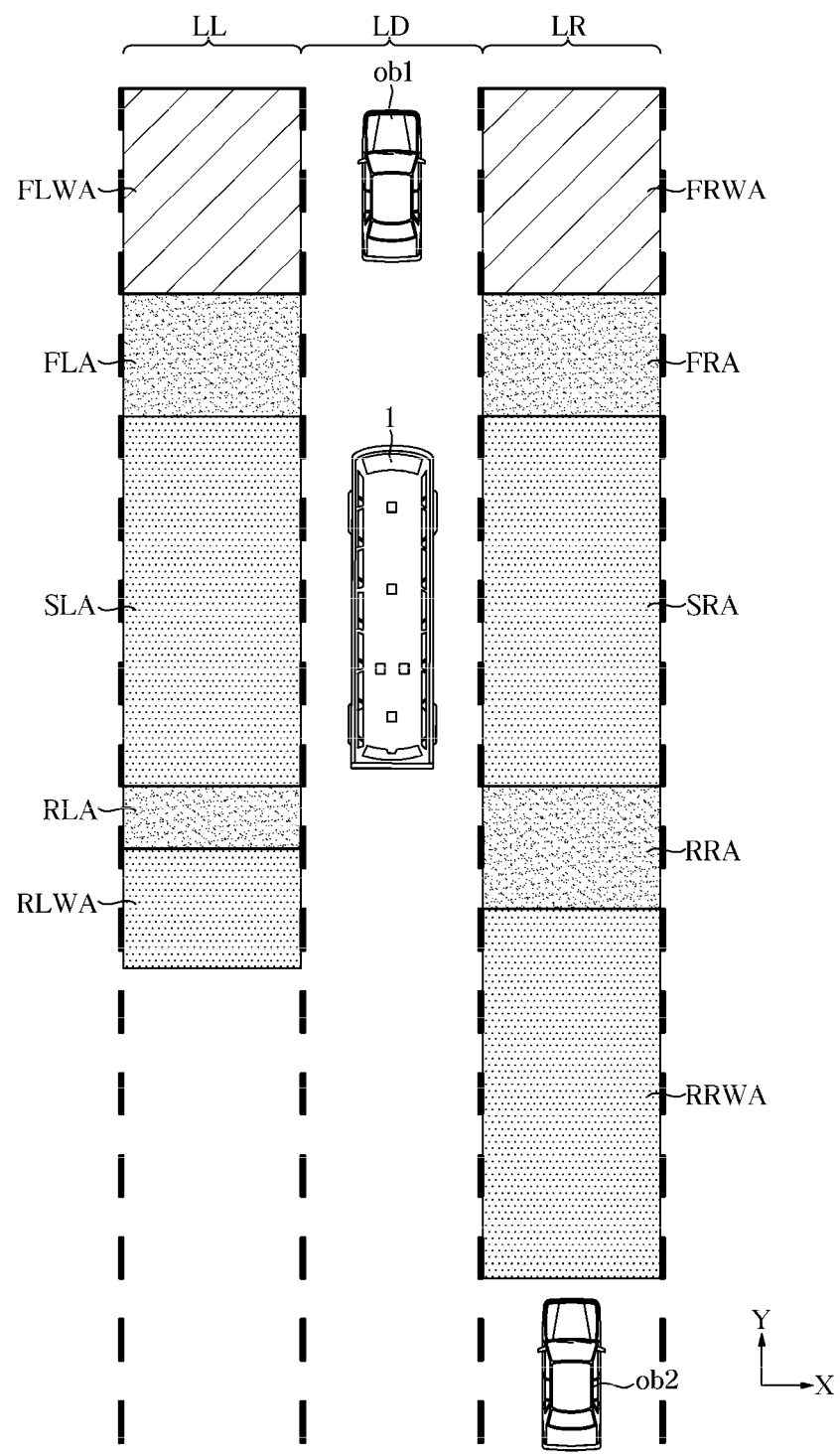
FIGS. 5 to 8 are views for describing a method of controlling a vehicle according to exemplary embodiments of the present invention.
Figure 6:
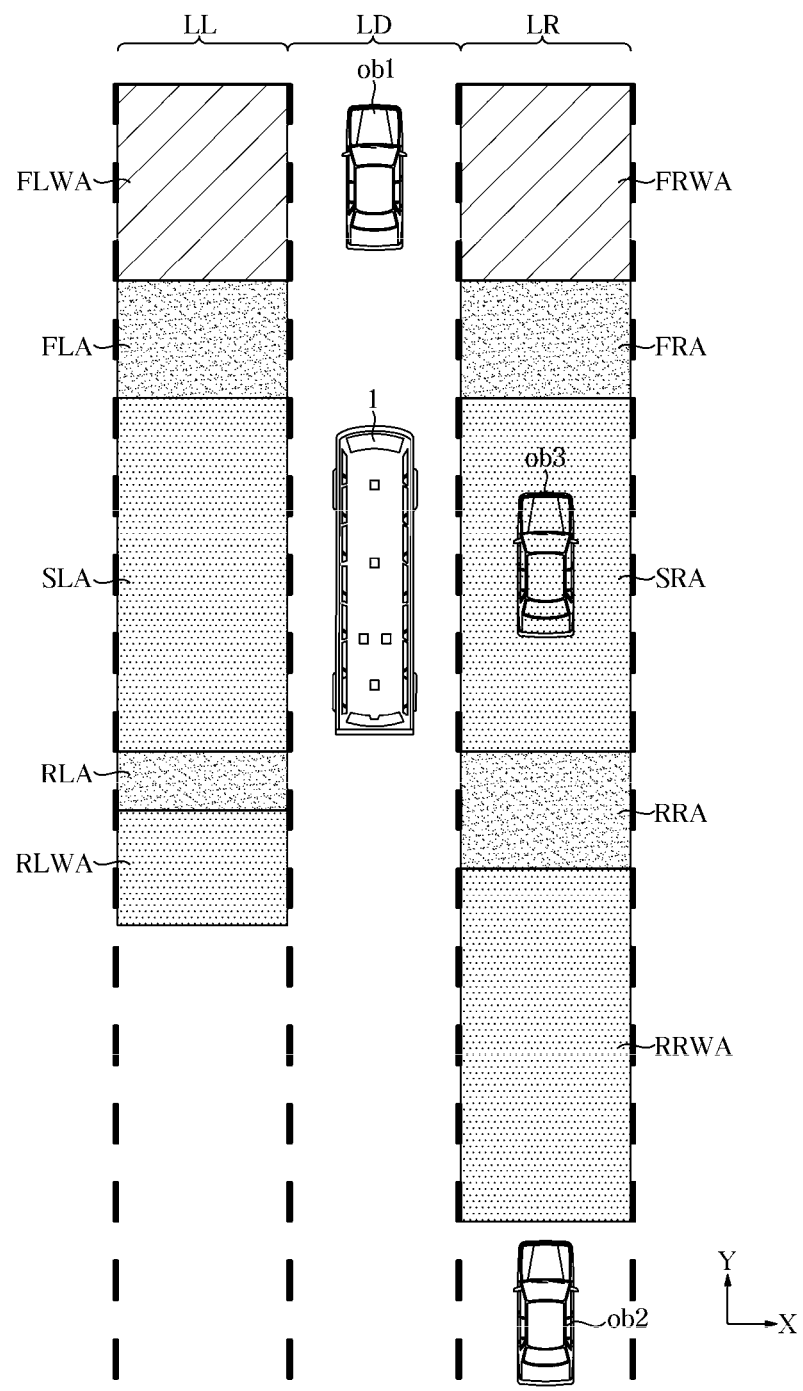

Referring to FIG. 5, the lateral side risk areas SLA and SRA are lateral areas that will be located when the vehicle 1 changes lanes, and areas where collision are inevitable during changes of the lanes when the obstacle exists in the lateral side risk areas SLA and SRA. For example, the lateral side risk s SLA and SRA may be determined as areas having the same y-axis length as the full length of the vehicle 1.

Furthermore, the front lateral side risk areas FLA and FRA are areas where the vehicle 1 passes when the vehicle 1 brakes to the maximum amount of braking immediately after the vehicle 1 changes the lanes. FLA, FRA, and areas where collision are inevitable when the obstacles remains in the front lateral side risk areas FLA and FRA. For example, the front lateral side risk areas FLA and FRA may be determined as areas having a y-axis length of (braking distance based on the maximum amount of braking of the vehicle×1.05) based on upper edge portions of the lateral side risk areas SLA and SRA. In the instant case, the reason for multiplying the braking distance of the vehicle 1 by 1.05 is to consider a safety margin of 5%, and the percentage of the safety margin may be changed according to a user's setting or an initial setting.

In other words, considering the safety margin of 10%, the front lateral side risk areas FLA and FRA may be determined as areas having the y-axis length of (braking distance based on the maximum amount of braking of the vehicle×1.1) based on upper edge portions of the lateral side risk areas SLA and SRA.

Furthermore, the rear lateral side risk areas RLA and RRA are areas that are determined based on the stopping distance of the rear obstacle ob2 in the adjacent lanes LL and LR, and areas in which collision are inevitable when the obstacle exists in the rear lateral side risk areas RLA and RRA when the vehicle 1 brakes to the maximum amount of braking immediately after the vehicle 1 changes the lanes. For example, the rear lateral side risk areas RLA and RRA may be determined as areas having the y-axis length of (stopping distance of the rear obstacle in the adjacent lane—braking distance of the vehicle) based on lower edge portions of the lateral side risk areas SLA and SRA. At the instant time, the stopping distance of the rear obstacle ob2 is obtained by adding the safety margin to a free running distance and the braking distance of the rear obstacle ob2. The free running distance may be determined by multiplying a speed of the rear obstacle ob2 and a determination time until the situation recognition and braking operation the rear obstacle ob2. In general, the determination time until the situation recognition and braking operation of the rear obstacle ob2 may be determined from 1 second to 3 seconds, and may be changed according to the user's setting or the initial setting.

Referring again to FIG. 3, the controller 400 may determine the risk areas FLA, FRA, SLA, SRA, RLA, and RRA, and may control a lane change and braking process of the vehicle 1 based on whether the obstacle is detected within the determined risk areas (1310). In detail, when the obstacle is detected in the risk areas, the controller 400 may control the vehicle 1 to brake the vehicle 1 while keeping the driving lane (1200).

When the lanes LL and LR adjacent to the driving lane LD of the vehicle 1 are two, the controller 400 may determine that the obstacle is detected in the risk areas when the obstacle is detected in each risk area in the adjacent lanes LL and LR. That is, referring to FIG. 6, since an obstacle ob3 is detected in the lateral side risk area SRA in a right lane LR, but no obstacle is detected in the risk areas FLA, SLA, and RLA in a left lane LL, the controller 400 may determine that no obstacle is detected in the risk areas FLA, SLA, and RLA in the left lane LL, and may control the vehicle 1 to be braked by changing the lane LD in which the vehicle 1 is driving to the left lane LL. That is, the process may be performed based on each of the adjacent lanes LL and LR.

In other words, when no obstacle is detected in the risk areas, the controller 400 may control the vehicle 1 to be braked by changing the lane on which the vehicle 1 is driving to the adjacent lane.

Figure 7:
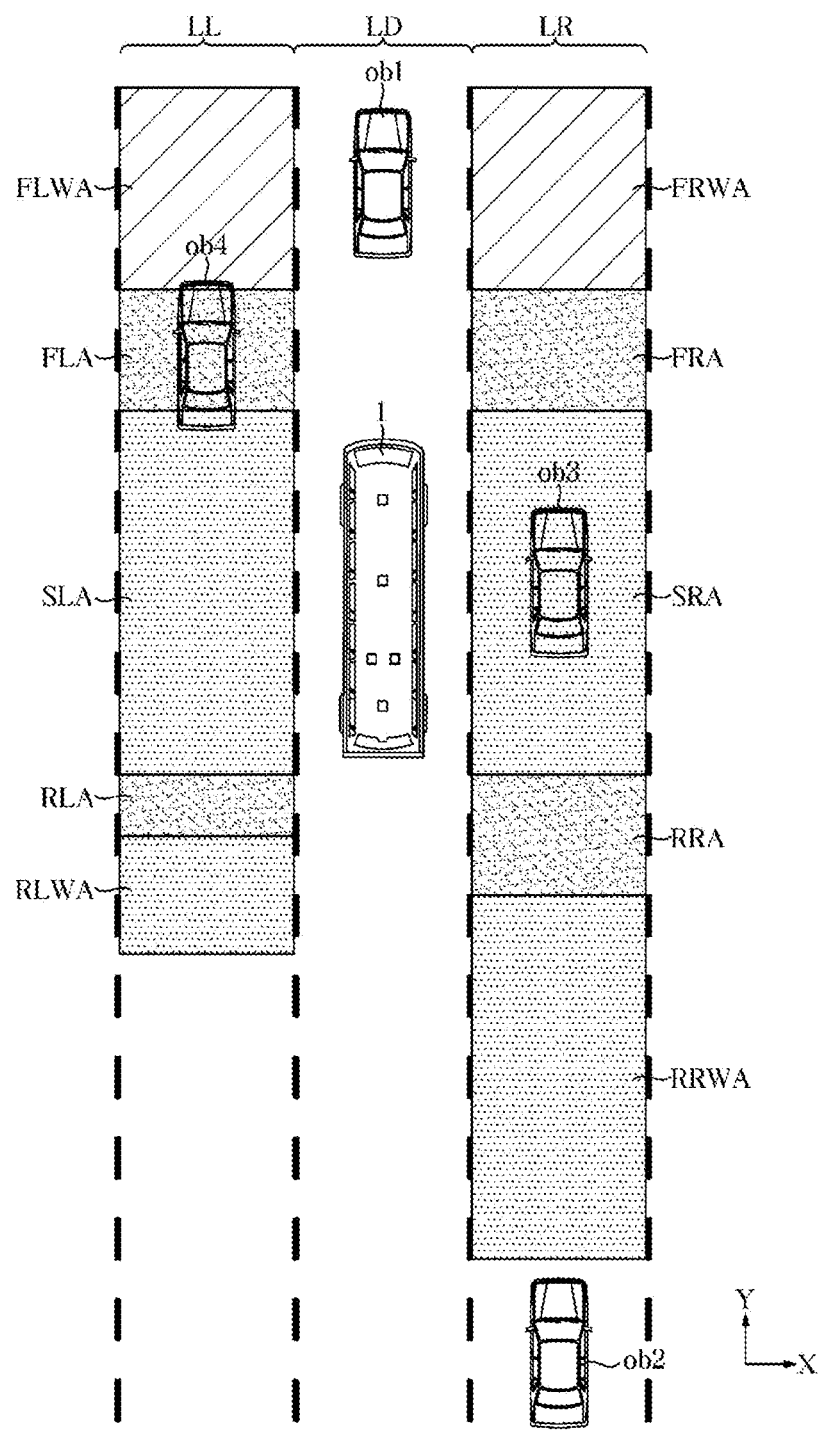

However, referring to FIG. 7, since the obstacle ob3 is also detected in the lateral side risk area SRA in the right lane LR, and an obstacle ob4 is detected in the lateral side risk area SLA and the front lateral side risk area FLA in the left lane LL, the controller 400 may determine that the obstacle is detected in each risk area of each of the adjacent lanes LL and LR, and may control the vehicle 1 to brake the vehicle 1 while keeping the driving lane.

When there is the obstacle in the risk areas, since the vehicle 1 changes the lanes and collides with the obstacles ob3 and ob4, the risk of overturning the vehicle 1 or the risk of secondary collision due to the collision may be greater than when the vehicle 1 collides with the front obstacle ob1. Therefore, even if the collision with the front obstacle is expected, when there is the obstacle in the risk areas, the damage may be minimized only by braking without changing the lane of the vehicle 1.

Referring again to FIG. 3, when there are two adjacent lanes and no obstacles in the risk areas of both lanes are detected, the controller 400 may determine warning areas FLWA, FRWA, RLWA, and RRWA to determine in which lane the vehicle 1 changes to braking (1320).

At the present time, the controller 400 may determine the warning areas FLWA, FRWA, RLWA, and RRWA in the adjacent lanes based on the braking distance of the vehicle 1 and obstacle information in the lanes LL and LR adjacent to the driving lane LD. The warning areas FLWA, FRWA, RLWA, and RRWA may be determined to be areas farther than the risk areas FLA, FRA, SLA, SRA, RLA, and RRA based on the vehicle 1. When the obstacle exists in the warning areas, the risk of collision between the vehicle 1 and the obstacle is not as high as that of the obstacle in the risk areas, but there may still be the risk of collision.

Referring to FIG. 5, the front lateral side warning areas FLWA and FRWA may be determined as areas from the y-axis coordinates of upper edge portions of the front lateral side risk areas FLA and FRA to the y-axis coordinates corresponding to (the braking distance based on the maximum amount of braking of the vehicle 1×1.5) with the front surface of the vehicle 1 as an origin.

For example, when the front lateral side risk areas FLA and FRA are determined to have y-axis length of (the braking distance based on the maximum amount of braking of the vehicle 1×1.05) based on to the upper edge portions of the lateral side risk areas SLA and SRA, the front lateral side warning areas FLWA and FRWA may be determined as areas from the y-axis coordinates corresponding to (the braking distance based on the maximum amount of braking of the vehicle 1×1.05) to the y-axis coordinates corresponding to (the braking distance based on the maximum amount of braking of the vehicle 1×1.5) based on the upper edge portions of the lateral side risk areas SLA and SRA. In the instant case, the reason for multiplying the braking distance of the vehicle 1 by 1.5 is to consider a safety margin of 50%, and the percentage of the safety margin may be changed according to the user's setting or the initial setting.

Furthermore, the rear lateral side warning areas RLWA and RRWA may be determined as areas from the y-axis coordinates of lower edge portions of the rear lateral side risk areas RLA and RRA to the y-axis coordinates corresponding to—(stopping distance of the rear obstacle in the adjacent lane−braking distance of the vehicle) with the rear surface of the vehicle 1 as the origin.

For example, when determining the rear lateral side risk areas RLA and RRA, when the stopping distance of the obstacle is determined as (free running distance of the obstacle+braking distance of the obstacle×1.05), the rear lateral side warning areas RLWA and RRWA may be determined as areas from the y-axis coordinate corresponding to—(stopping distance of the rear obstacle in the adjacent lane+braking distance of the rear obstacle in the adjacent lane×1.05−braking distance of the vehicle) to the y-axis coordinates corresponding to—(stopping distance of the rear obstacle in the adjacent lane+braking distance of the rear obstacle in the adjacent lane×1.5−braking distance of the vehicle) based on the lower edge portions of the lateral side risk areas RLA and RRA. In the instant case, the reason for multiplying the braking distance of the vehicle 1 by 1.5 is to consider a safety margin of 50%, and the percentage of the safety margin may be changed according to the user's setting or the initial setting. In the instant case, the reason for multiplying the braking distance of the rear obstacle in the adjacent lane by 1.5 is to consider the safety margin of 50%, and the percentage of the safety margin may be changed according to the user's setting or the initial setting.

Referring again to FIG. 3, the controller 400 may determine whether the obstacle is detected in the warning area in a first adjacent lane corresponding to a left adjacent lane LL or a right adjacent lane LR among two adjacent lanes LL and LR (1330). The first adjacent lane may be a term for indicating the adjacent lane in a direction opposite to a second adjacent lane. When the first adjacent lane is the left adjacent lane, the second adjacent lane becomes the right adjacent lane. When the first adjacent lane is the right adjacent lane, the second adjacent lane becomes the left adjacent lane. For convenience of explanation, it is assumed that the first adjacent lane is the left adjacent lane and the second adjacent lane is the right adjacent lane.

When no obstacle is detected in the warning areas FLWA and RLWA in the first adjacent lane LL, the controller 400 may control the vehicle 1 to be braked by changing the lane on which the vehicle 1 is driving to the first adjacent lane (1331). In the above situation, since there are no obstacles in the risk areas and the warning areas in the first adjacent lane, the risk of collision will be very low when the vehicle 1 changes the brake to the first adjacent lane LL.

When the obstacle is detected in the warning areas FLWA and RLWA in the first adjacent lane LL, the controller 400 may determine whether the obstacle is detected in the warning areas FRWA and RRWA in the second adjacent lane LR. (1340).

As described above, when no obstacle is detected in the warning areas FRWA and RRWA in the second adjacent lane LR, the obstacle does not exist in the risk areas and the warning areas in the second adjacent lane LR. Accordingly, when the obstacle is not detected in the warning areas of the second adjacent lane (NO in 1340), the controller 400 may control the vehicle 1 to be braked by changing the lane on which the vehicle 1 is driving to the second adjacent lane (1341).

When the obstacle is detected in the warning areas FRWA and RRWA in the second adjacent lane LR (YES in 1340), the controller 400 may determine the vehicle 1 to be braked by changing the lane on which the vehicle 1 is driving to the first or second adjacent lane LL or LR (1342). At the instant time, the controller 400 may determine the possibility of collision based on the relative speed and distance between the obstacle existing in the warning area and the vehicle 1, and it may be desirable to brake the driving lane on which the vehicle 1 is driving by changing the lanes to the lanes in which the obstacle with a low probability of collision exists.

Figure 8:
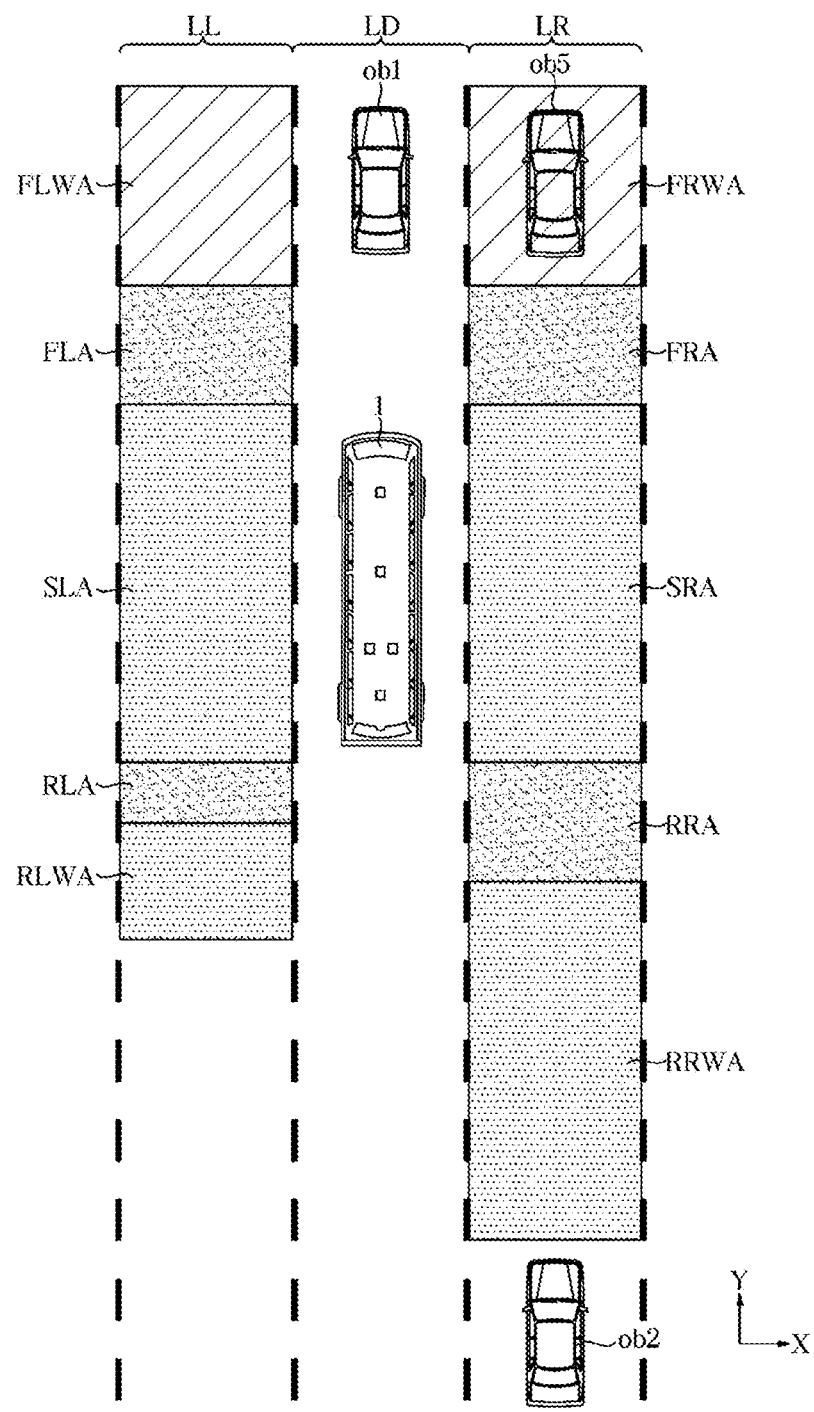

Referring to FIG. 8, since the controller 400 does not detect obstacles in the warning areas FLWA and RLWA in the first adjacent lane LL, the controller 400 may control the vehicle 1 to be braked by changing the lane on which the vehicle 1 is driven to the first adjacent lane LL. Furthermore, although not illustrated in the drawing, when the obstacle is detected in the warning areas FLWA and RLWA in the first adjacent lane LL, the controller 400 may control the vehicle 1 to be braked by changing the lane on which the vehicle 1 is driving to the first or second adjacent lanes.

Although not illustrated in the drawing, when the controller 400 controls the vehicle 1 to be braked by changing the lane on which the vehicle 1 is driving (1331, 1341), the controller 400 may generate a control signal for generating a first steering torque for steering the steering wheel of the vehicle 1 and transmit the control signal to the steering angle regulator 600. At the instant time, when the first steering torque and the change amount in the steering angle of the steering wheel do not correspond, the controller 400 may control the vehicle 1 to generate a second steering torque for fixing the steering wheel and transmit the second steering torque to the steering angle regulator 600 such that the vehicle 1 is braked while keeping the driving lane.

When the control signal for outputting the first steering torque is transmitted to the steering angle regulator 600 but the change amount in the steering angle corresponding to the first steering torque is not output, the driver's body may be interfering with steering of the steering wheel. For example, it may correspond to a state in which the driver's arm is caught in the steering wheel momentarily and the driver's upper body is pressing the steering wheel.

When the driver's body, which is inoperable state, affects steering of the steering wheel, there is the risk that the vehicle 1 may be overturned or the secondary accident may occur due to an unexpected steering occurrence, minimizing damage by generating only steering torque to fix the steering torque without changing the lane.

Figure 9:
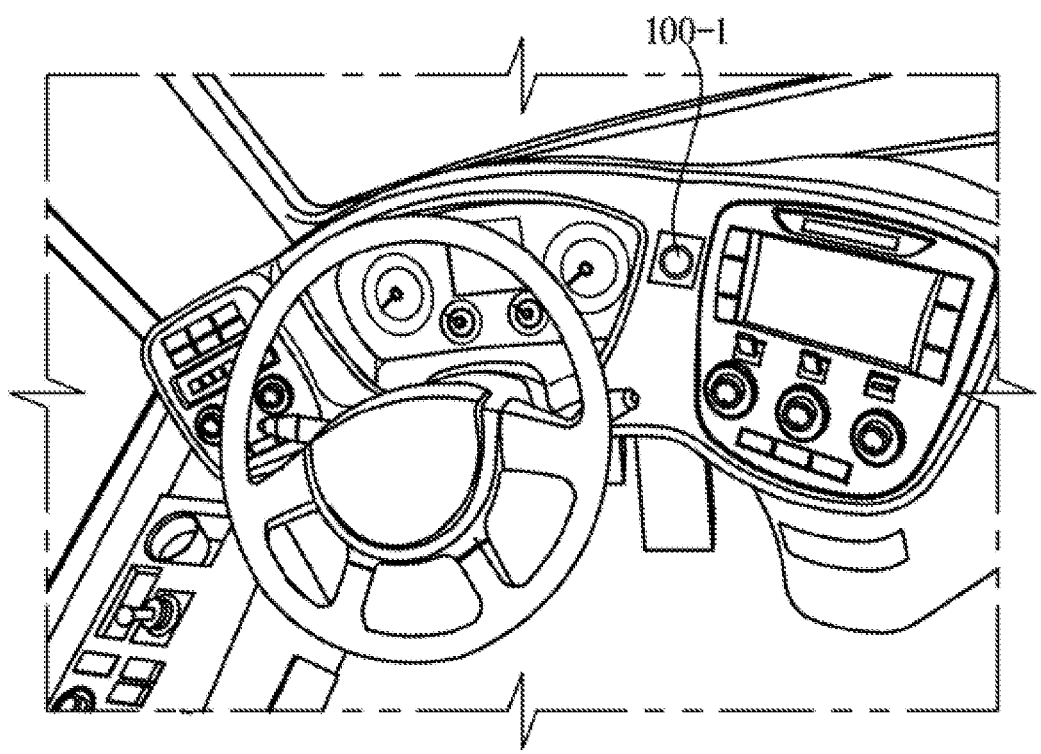
FIG. 9 and FIG. 10 are views illustrating an inputter according to exemplary embodiments of the present invention.
Figure 10:
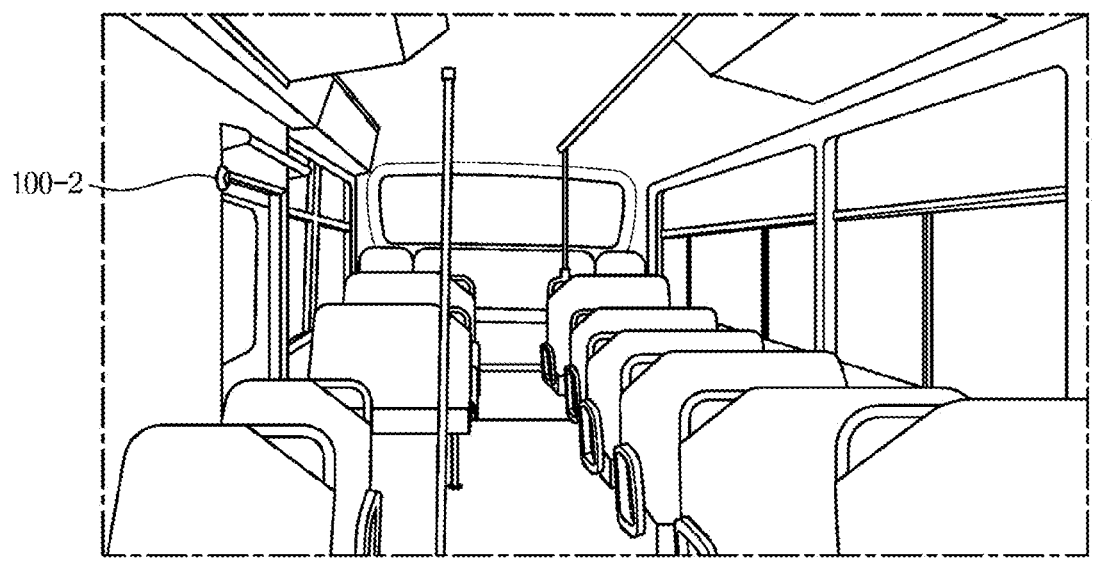

FIG. 9 and FIG. 10 are views illustrating an inputter according to exemplary embodiments of the present invention.

Referring to FIG. 9, the inputter 100 may include a driver button 100-1 for receiving at least one of the emergency stop command an emergency stop release command from the driver of the vehicle 1. The driver button 100-1 may be provided around a driver's seat to allow the driver to detect a physical abnormality and directly input the emergency stop command. For example, when the driver presses the driver button 100-1 more than once, the controller 400 may determine that the emergency stop command is received. Furthermore, when the driver presses the driver button 100-1 for the predetermined time period or Moreover, the controller 400 may determine that the emergency stop release command is received.

When the emergency stop release command is received, the controller 400 may change the driving mode of the vehicle 1 to a manual driving mode to restore the driver's right to control driving.

Referring to FIG. 10, the inputter 100 may include a passenger button 100-2 for receiving the emergency stop command from a passenger of the vehicle 1. The passenger button 100-2 may be provided at a position where the passenger of the vehicle 1 may be pressed as rapidly as possible, as illustrated in FIG. 10. Referring to FIG. 10, although the passenger button 100-2 is provided near a discharging door of the vehicle 1, it may be desirable to be provided near the driver's seat to allow the passenger to determine the driver's state and input the emergency stop command.

To prevent the emergency stop release command from being input in the driver's inoperable state due to a wrong input of the passenger, the passenger button 100-2 may receive only the emergency stop command. That is, even when the passenger presses the passenger button 100-2 for the predetermined time period or Moreover, the controller 400 does not determine that the emergency stop release command is received.

According to the vehicle and the method of controlling the vehicle according to the exemplary embodiments of the present invention, when the driver of the vehicle is in the inoperable state, a collision accident may be prevented by performing the lane change and the braking based on an obstacle situation around the vehicle.

The disclosed exemplary embodiments may be implemented in a form of a recording medium storing instructions that are executable by a computer. The instructions may be stored in a form of a program code, and when executed by a processor, the instructions may generate a program module to perform operations of the included exemplary embodiments. The recording medium may be implemented non-transitory as a computer-readable recording medium.

The non-transitory computer-readable recording medium may include all kinds of recording media storing commands which may be interpreted by a computer. For example, the non-transitory computer-readable recording medium may be, for example, ROM, RAM, a magnetic tape, a magnetic disc, flash memory, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a sensor configured to detect at least an obstacle around the vehicle; and
a controller connected to the sensor and configured to:
receive an emergency stop command;
determine that an emergency stop condition is satisfied when a driver's state is determined as a predetermined inoperable state, a steering wheel is not operated for a predetermined time period, or a rate of change of a yaw rate of the vehicle exceeds a predetermined value;
when the emergency stop command is received or the emergency stop condition is satisfied, determine whether the vehicle can avoid collision with a front obstacle of the at least an obstacle only by braking of the vehicle without a lane change of a driving lane of the vehicle;
when it is determined, by the controller, that the vehicle cannot avoid the collision with the front obstacle only by the braking of the vehicle, determine a risk area in an adjacent lane based on a braking distance of the vehicle and obstacle detection information in the adjacent lane located adjacent to the driving lane of the vehicle; and
control the lane change or the braking of the vehicle based on whether the at least an obstacle is detected in the determined risk area,
wherein the controller is further configured to:
control the vehicle to be braked by changing the driving lane on which the vehicle is driven to the adjacent lane when the at least an obstacle is not detected within the determined risk area;
determine a warning area in the adjacent lane based on the braking distance of the vehicle and obstacle information in adjacent lanes disposed adjacent to the driving lane, wherein the adjacent lanes includes a first adjacent lane and a second adjacent lane which is adjacent in an opposite direction to the first adjacent lane, and the warning area includes a first warning area in the first adjacent lane and a second warning area in the second adjacent lane; and
when the at least an obstacle is detected in the first warning area and the at least an obstacle is not detected in the second warning area, control the vehicle to be braked by changing the driving lane on which the vehicle is driven to the second adjacent lane,
wherein the warning area is determined to be an area farther from the determined risk area with respect to the vehicle.

2. The vehicle according to claim 1, wherein the controller is further configured to control the vehicle to brake the vehicle while keeping the driving lane when it is determined, by the controller, that the vehicle can avoid the collision with the front obstacle only by the braking of the vehicle without the lane change.

3. The vehicle according to claim 1, wherein the controller is further configured to control the vehicle to brake the vehicle while keeping the driving lane when the at least an obstacle is detected within the determined risk area.

4. The vehicle according to claim 1, wherein the controller is further configured to:
determine a front lateral side risk area based on the braking distance of the vehicle;
determine a lateral side risk area based on an overall length of the vehicle; and
determine a rear lateral side risk area based on a stopping distance of a rear obstacle of the at least an obstacle in the adjacent lane.

5. The vehicle according to claim 1, wherein the controller is further configured to:
transmit a control signal for generating a first steering torque for steering the steering wheel of the vehicle;
when it is determined, by the controller, that the first steering torque and a change amount in a steering angle of the steering wheel do not correspond, transmit a control signal for generating the first steering torque for fixing the steering wheel; and control the vehicle to brake the vehicle while keeping the driving lane.

6. The vehicle according to claim 1, wherein the controller is further configured to change a driving mode of the vehicle to an autonomous driving mode when the emergency stop command is received or the emergency stop condition is satisfied.

7. The vehicle according to claim 6, wherein the controller is further configured to receive an emergency stop release command and change the driving mode of the vehicle to a manual driving mode when the emergency stop release command is received.

8. A method of controlling a vehicle, the method comprising:

determining, by a controller, whether an emergency stop command is received or an emergency stop condition is satisfied;

when the emergency stop command is received or the emergency stop condition is satisfied, determining, by the controller, whether the vehicle can avoid collision with a front obstacle of at least an obstacle only by braking of the vehicle without a lane change of a driving lane of the vehicle;

when it is determined, by the controller, that the vehicle cannot avoid the collision with the front obstacle only by the braking of the vehicle, determining, by the controller, a risk area in an adjacent lane based on a braking distance of the vehicle and obstacle detection information in the adjacent lane located adjacent to the driving lane of the vehicle; and controlling, by the controller, the lane change or the braking of the vehicle based on whether the at least an obstacle is detected in the determined risk area, wherein the controlling of the lane change or the braking of the vehicle based on whether the at least an obstacle is detected in the determined risk area includes:

controlling, by the controller, the vehicle to be braked by changing the driving lane on which the vehicle is driven to the adjacent lane when the at least an obstacle is not detected within the determined risk area;

determining, by the controller, a warning area in the adjacent lane based on the braking distance of the vehicle and obstacle information in adjacent lanes disposed adjacent to the driving lane, wherein the adjacent lanes include a first adjacent lane and a second adjacent lane which is adjacent in an opposite direction to the first adjacent lane, and the warning area includes a first warning area in the first adjacent lane and a second warning area in the second adjacent lane; and when the at least an obstacle is detected in the first warning area and the at least an obstacle is not detected in the second warning area, controlling, by the controller, the vehicle to be braked by changing the driving lane on which the vehicle is driven to the second adjacent lane, wherein the warning area is determined to be an area farther from the determined risk area with respect to the vehicle.

9. The method according to claim 8, further including:

controlling, by the controller, the vehicle to brake the vehicle while keeping the driving lane when it is determined, by the controller, that the vehicle can avoid the collision with the front obstacle only by the braking of the vehicle without the lane change.

10. The method according to claim 8, wherein the controlling of the lane change or the braking of the vehicle based on whether the at least an obstacle is detected in the determined risk area includes:

controlling the vehicle to brake the vehicle while keeping the driving lane when the at least an obstacle is detected within the determined risk area.

11. The method according to claim 8, wherein the determining of the determined risk area in the adjacent lane based on the braking distance of the vehicle and the obstacle detection information in the adjacent lane located adjacent to the driving lane of the vehicle includes:

determining a front lateral side risk area based on the braking distance of the vehicle;

determining a lateral side risk area based on an overall length of the vehicle; and determining a rear lateral side risk area based on a stopping distance of a rear obstacle of the at least an obstacle in the adjacent lane.

12. The method according to claim 8, further including:

transmitting, by the controller, a control signal for generating a first steering torque for steering a steering wheel of the vehicle;

when it is determined, by the controller, that the first steering torque and a change amount in a steering angle of the steering wheel do not correspond, transmitting, by the controller, a control signal for generating the first steering torque for fixing the steering wheel; and controlling, by the controller, the vehicle to brake the vehicle while keeping the driving lane.

13. The method according to claim 8, further including:

changing, by the controller, a driving mode of the vehicle to an autonomous driving mode when the emergency stop command is received or the emergency stop condition is satisfied.

14. The method according to claim 13, further including:

changing, by the controller, the driving mode of the vehicle to a manual driving mode when an emergency stop release command is received.

* * * * *